US008759976B2

(12) United States Patent
Edelstein et al.

(10) Patent No.: US 8,759,976 B2
(45) Date of Patent: Jun. 24, 2014

(54) STRUCTURE WITH SUB-LITHOGRAPHIC RANDOM CONDUCTORS AS A PHYSICAL UNCLONABLE FUNCTION

(75) Inventors: Daniel C. Edelstein, White Plains, NY (US); Gregory M. Fritz, Yorktown Heights, NY (US); Stephen M. Gates, Ossining, NY (US); Dirk Pfeiffer, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 13/570,972

(22) Filed: Aug. 9, 2012

(65) Prior Publication Data

US 2014/0042628 A1 Feb. 13, 2014

(51) Int. Cl.
*H01L 23/485* (2006.01)
(52) U.S. Cl.
USPC .......................................................... 257/758
(58) Field of Classification Search
CPC .................................................... H01L 23/485
USPC .......................................................... 257/758
See application file for complete search history.

(56) References Cited

U.S. PATENT DOCUMENTS

| 6,256,767 B1 | 7/2001 | Kuekes et al. |
| 7,564,262 B2 | 7/2009 | Mouttet |
| 7,605,081 B2 | 10/2009 | Yang et al. |
| 7,741,721 B2 | 6/2010 | Black et al. |

OTHER PUBLICATIONS

Fischer, S. H., et al., "A Survey of Combustible Metals, Thermites, and Intermetallics for Pyrotechnic Applications", 32nd AIAA/ASME/SAE/ASEE Joint Propulsion Conference, Jul. 1-3, 1996, Lake Buena Vista, FL.
Knepper, R., et al., "Effect of varying bilayer spacing distribution on reaction heat and velocity in reactive Al/Ni multilayers", J. Appl. Phys., Apr. 2009, 105, 083504.
Koemmerling, O., et al., "Design Principles for Tamper-Resistant Smartcard Processors", Proceedings of the USENIX Workshop on Smartcard Technology (Smartcard '99), May 10-11, 1999, Chicago, Illinois, USA, USENIX Association, pp. 9-20.
Park, S. H., et al., "Block copolymer multiple patterning integrated with conventional ArF lithography", Soft Matter, first published as an Advance Article on the web Sep. 17, 2009, 6, pp. 120-125.
Lu, W., et al., "Nanoelectronics from the bottom up", Nature Materials, Nov. 2007, vol. 6.

*Primary Examiner* — Tran Tran
(74) *Attorney, Agent, or Firm* — Scully, Scott, Murphy & Presser, P.C.; Louis J. Percello, Esq.

(57) ABSTRACT

A secure electronic structure including a plurality of sub-lithographic conductor features having non-repeating random shapes as a physical unclonable function (PUF) and an integrated circuit including the same are provided. Some of the conductor features of the plurality of conductor features form ohmic electrical contact to a fraction of regularly spaced array of conductors that are located above or beneath the plurality of conductor features having the non-repeating shapes, while other conductor features of the plurality of conductor features do not form ohmic electrical contact with any of the regularly spaced array of conductors. Thus, a unique signature of electrical continuity is provided which can be used as a PUF within an integrated circuit.

19 Claims, 7 Drawing Sheets

STRUCTURE WITH SUB-LITHOGRAPHIC RANDOM CONDUCTORS AS A PHYSICAL UNCLONABLE FUNCTION

BACKGROUND

The present disclosure relates to a secure electronic structure, an integrated circuit which includes the secure electronic structure and a method of forming the same. More particularly, the present disclosure relates to an electronic structure containing sub-lithographic random conductors as a physical unclonable function or PUF.

In the electronics industry, security in an electronic device has become a major concern of manufacturers and users of such devices. In this regard, it is useful to be able to distinguish each electronic device, especially the integrated circuit (IC) within these devices, from each other. This is particularly true for devices such as computers, personal hand held devices, cellular phones, chip cards, and other devices that contain sensitive information. Developers of electronic devices continuously strive to provide systems and methods that make their products impervious to unauthorized access or use. Communication devices used in the military and security fields are one category of devices that must remain secure despite physical and electrical tampering, while other categories also require this feature.

At the same time, most applications have cost limitations that must be taken into account. For example, if a complicated authentication process requiring storage and computing resources were employed on an integrated circuit, the costs incurred may not justify the cost of security accomplished, particularly if the end product were a low cost and mass produced consumer product.

One approach to solve the above identified problems is to employ a physical unclonable function (PUF) to provide a unique, secure bit, word or function for use in generating security keys. A PUF may eliminate the need for storage of a public or private key on a device. PUFs are known in the art to be implemented by circuits, components, processes or other entities capable of generating an output, such as a digital bit, word or a function that is resistant to cloning.

Typically, the PUF can be generated based on inherent physical characteristics of a device such as, for example, individual physical characteristics of a transistor such as a threshold voltage of the transistor which varies due to local process variations during manufacturing. There is no need to store the PUF within the device, because the PUF can be generated repeatedly. Moreover, it is nearly impossible to clone a device having a PUF implemented in a manner to generate the same PUF output with another device.

Although PUFs have been implemented within electronic devices and secure IC's, there exists a need to create an electronic structure having a physical unclonable function embodied in the physical structure, which is easy to evaluate but hard to predict, and which is formed using standard integrated circuit manufacturing methods and materials. It is desirable to fabricate the PUF during standard integrated circuit manufacturing and to add a minimum number of additional process steps in order to complete the PUF structure.

There are special applications of a PUF structure in which a secure integrated circuit must remain secure requiring destruction or erasure of the information stored in the PUF, and it is desirable for destruction or erasure to be rapid and easily triggered by an electrical pulse. Thus, a PUF that is quickly erased is needed in special secure IC's.

In present and future IC's another aspect that is desirable is fabrication of a PUF that is as small as possible, thus using a minimum amount of area of the IC or chip. Construction of a very small PUF structure with a minimum area is facilitated using sub-lithographic dimensions, and there exists a need for a PUF in which the patterned dimensions are less than about 40 to 50 nm, and in which a lithographic patterning step is avoided during fabrication in order to generate the random pattern for the PUF element, and to reduce fabrication costs.

SUMMARY

The present disclosure provides a secure electronic structure including a plurality of sub-lithographic conductor features having non-repeating random shapes as a physical unclonable function (PUF), and an integrated circuit including the same. By "sub-lithographic", it is meant that the conductor features having the non-repeating random shapes have dimensions that are smaller than the smallest features created by lithographic means on the same wiring level. As of the filing date of this application, sub-lithographic is a dimension of 50 nm or less. Some of the conductor features of the plurality of conductor features form ohmic electrical contacts to a fraction of a regularly spaced array of conductors that are located beneath or above the plurality of conductor features having the non-repeating random shapes, while other conductor features of the plurality of conductor features do not form ohmic electrical contact with any of the regularly spaced array of conductors. Thus, a unique signature of electrical continuity is provided which can be used as a PUF within an integrated circuit. In some embodiments, the conductor features can be easily erased in response to an electrical pulse to render the PUF unreadable.

In one aspect of the present disclosure, an electronic structure including a PUF is provided. The electronic structure of the present disclosure includes a first level and a second level atop the first level. In accordance with the present disclosure, one of the first level or the second level comprises a regularly spaced array of conductors, and the other of the first level or second level not including the regularly spaced array of conductors comprises a plurality of conductor features, wherein each conductor feature of the plurality of conductor features is present as non-repeating random shapes, and wherein a fraction of some of the conductor features of the plurality of conductor features provides electrical contact between pairs of the regularly spaced array of conductors, and another fraction of other of the conductor features of the plurality of the conductor features does not provide electrical contact between any pair of the regularly spaced array of conductors.

In another aspect of the present disclosure, an integrated circuit including an electronic structure having a PUF is provided. Specifically, the integrated circuit includes at least one semiconductor device located upon a portion of a semiconductor substrate. A first level is located atop the semiconductor substrate, and a second level is located atop the first level. In accordance with the present disclosure, one of the first level or the second level comprises a regularly spaced array of conductors, and the other of the first level or second level not including the regularly spaced array of conductors comprises a plurality of conductor features, wherein each conductor feature of the plurality of conductor features is present as non-repeating random shapes, and wherein a fraction of some of the conductor features of the plurality of conductor features provides electrical contact between pairs of the regularly spaced array of conductors, and another fraction of other of the conductor features of the plurality of the conductor features does not provide electrical contact between any pair of the regularly spaced array of conductors.

In a further aspect of the present disclosure, a method of forming an electronic structure including a physical unclonable function is provided. Specifically, the method of the present disclosure includes forming a first level, and forming a second level atop the first level, wherein one of the first level or second level comprises a regularly spaced array of conductors embedded with a dielectric material; and wherein the other of the first level or the second level not including the regularly spaced array of conductors comprises a plurality of conductor features, wherein each conductor feature of the plurality of conductor features is present as non-repeating random shapes, wherein a fraction of some of the conductor features of the plurality of conductor features provides electrical continuity between pairs of the regularly spaced array of conductors, and another fraction of other of the conductor features of the plurality of the conductor features does not provide electrical continuity between any pair of the regularly spaced array of conductors.

DETAILED DESCRIPTION

The present disclosure, which provides a secure electronic structure with a physical unclonable function (PUF), an integrated circuit including the secure electronic structure and a method of fabricating the same, will now be described in greater detail by referring to the following discussion and drawings that accompany the present application. It is noted that the drawings of the present application are provided for illustrative purposes and, as such, they are not drawn to scale. In the drawings and the description that follows, like elements are referred to by like reference numerals. For purposes of the description hereinafter, the terms "upper", "lower", "right", "left", "vertical", "horizontal", "top", "bottom", and derivatives thereof shall relate to the components, layers and/or elements as oriented in the drawing figures which accompany the present application.

In the following description, numerous specific details are set forth, such as particular structures, components, materials, dimensions, processing steps and techniques, in order to provide a thorough understanding of the present invention. However, it will be appreciated by one of ordinary skill in the art that the present disclosure may be practiced with viable alternative process options without these specific details. In other instances, well-known structures or processing steps have not been described in detail in order to avoid obscuring the various embodiments of the present disclosure.

As stated above and in some embodiments of the present disclosure, a secure electronic device and an integrated circuit that includes the same are provided. More particularly, the present disclosure provides an electronic structure in which a code for authentication is stored directly on an integrated circuit, using a unique physical identifier (or code) fabricated within the electronic structure. The secure electronic structure of the present disclosure retains the unique code. If the electronic structure or the integrated circuit including the electronic structure is altered, manipulated or cloned then the physical fingerprint is changed and therefore the digital code will not be executed, and the electronic structure or integrated circuit including the same will be disabled.

In the present disclosure, the secrets of the electronic structure are not stored in binary form when the electronic structure is powered down, but are hidden in the formed of unique identifiers (i.e., PUFs) within the electronic structure itself. A unique physical identifier or fingerprint thus can exist on every chip due to inherently random variations. These random variations can be utilized as a unique physical identifier of each integrated circuit.

The electronic structure of the present disclosure which includes the PUF can be made utilizing standard semiconductor manufacturing methods and materials, while utilizing a minimum of added processing steps. Also, the electronic structure of the present disclosure has the following characteristics: (i) reliability to avoid bit errors: The electronic structure of the present disclosure is stable and the PUF value does not drift significantly over time and temperature. (ii) Random variability: Variability of the electronic structure of the present disclosure is significant enough to enroll millions of electronic structures to give each a unique code and the PUF values are random to avoid would be attackers, i.e., hackers, from guessing specific patterns. Variability is also important to the PUF stability to avoid bit errors. (iii) Tamper response:

The PUF within the electronic structure of the present disclosure is destroyed or erased in response to a tampering event.

As stated above, the electronic structure of the present disclosure includes a plurality of sub-lithographic conductor features having non-repeating random shapes as a physical unclonable function (PUF). Some of the conductor features of the plurality of conductor features form ohmic electrical contact to a fraction of regularly spaced array of conductors that are located beneath or above the plurality of conductor features having the non-repeating random shapes, while other conductor features of the plurality of conductor features do not form ohmic electrical contact with any of the regularly spaced array of conductors. The specific pattern of ohmic connections from each random to each non-random interconnect is itself a random pattern of continuous circuit paths, which can be read or addressed by a standard integration circuit connected to the other ends of each interconnect, both the random ones and the array ones. Thus, a unique signature of electrical continuity is provided which can be used as a PUF within an integrated circuit.

The locations in which electrical continuity between the conductors of the different levels is obtained and the locations in which electrical continuity is not obtained can be assigned into groups (i.e., bins) to represent the digital 0 or 1. Because of the non-repeating random shape of the conductors, a unique PUF is established within the electronic structure of the present disclosure.

The electronic structure can be formed atop a semiconductor substrate including at least one semiconductor device, i.e., transistor, resistor, capacitor, diode, and BiCMOS, located thereon providing an integrated circuit of the present disclosure. The electronic structure of the present disclosure can be conveniently fabricated during standard BEOL interconnect processing. This aspect of the present disclosure will become more apparent in the description of the various methods that can be used in forming the electronic structure of the present disclosure. Although the various methods and structures are shown and illustrated with the regularly spaced array of conductors within the first level and the plurality of conductor features having non-repeating shapes in the second level, the present disclosure also includes embodiments in which the regularly spaced array of conductors can be located within the second level and the plurality of conductor features having non-repeating shapes can be in the first level. In such an embodiment, the methods described below can be used in forming such as structure however the processing steps are reversed such that the plurality of conductor features having non-repeating shapes are formed in the first level and thereafter the regularly spaced array of conductors are formed in the second level.

Figure 1:
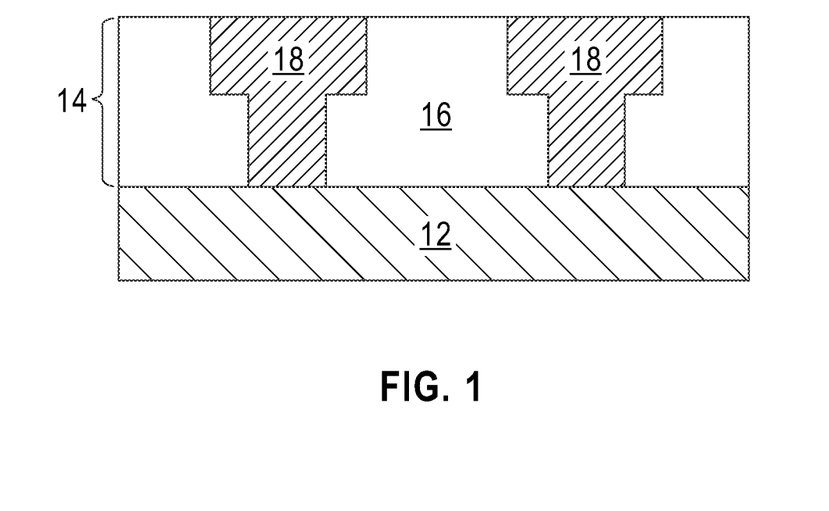
FIG. 1 is a pictorial representation (through a cross sectional view) depicting an initial structure including a first level comprising a regularly spaced array of conductors located within a first dielectric material that can be employed in one embodiment of the present disclosure.

Referring first to FIG. 1, there is depicted an initial structure including a first level 14 comprising a regularly spaced array of conductors 18 located within a dielectric material 16 that can be employed in one embodiment of the present disclosure. The first level 14 is formed atop a substrate 12.

The substrate 12 may comprise a semiconducting material, an insulating material, a conductive material or any combination including multilayers thereof. When the substrate 12 is comprised of a semiconducting material, any semiconductor such as, for example, Si, SiGe, SiGeC, SiC, Ge alloys, GaAs, InAs, InP and other III/V or II/VI compound semiconductors may be used. In addition to these listed types of semiconducting materials, the present disclosure also contemplates cases in which the semiconductor substrate is a layered semiconductor such as, for example, Si/SiGe, Si/SiC, silicon-on-insulators (SOIs) or silicon germanium-on-insulators (SGOIs). In some embodiments of the present disclosure, the semiconducting material may include one or more semiconductor devices formed thereon. For clarity the one or more semiconductor devices are not shown in the drawings.

When the substrate 12 is an insulating material, the insulating material can be an organic insulator, an inorganic insulator or a combination thereof including multilayers. When the substrate 12 is a conductive material, the substrate may include, for example, polySi, an elemental metal, alloys of elemental metals, a metal silicide, a metal nitride or combinations thereof including multilayers. When the substrate 12 comprises a combination of an insulating material and a conductive material, the substrate may represent one of level which can be positioned beneath the electronic structure of the present disclosure.

The dielectric material 16 of the initial structure may include any interlevel or intralevel dielectric material including inorganic dielectrics and/or organic dielectrics. The dielectric material 16 may be porous, non-porous or contain regions and/or surfaces that are porous and other regions and/or surfaces that may be non-porous. Some examples of suitable dielectrics that can be used as the dielectric material 16 include, but are not limited to, silicon oxide, silsesquioxanes, C doped oxides (i.e., organosilicates) that include atoms of Si, C, O and H (called "SiCOH" materials, SiCOH materials containing porosity, thermosetting polyarylene ethers, or multilayers thereof. The term "polyarylene" is used in this application to denote aryl moieties or inertly substituted aryl moieties which are linked together by bonds, fused rings, or inert linking groups such as, for example, oxygen, sulfur, sulfone, sulfoxide, carbonyl and the like. In one embodiment, the dielectric material 16 has a dielectric constant that is less than silicon oxide, i.e., less than 4.0. In another embodiment, dielectric material 16 that can be employed in the present disclosure has a dielectric constant of 3.0 or less. All dielectric constants mentioned herein are relative to a vacuum, unless otherwise noted. Interconnects embedded in dielectrics which have a dielectric constant of less than that of silicon oxide generally have lower parasitic capacitance and capacitive crosstalk as compared with interconnects in dielectric materials that have a higher dielectric constant equal to, or greater than, silicon oxide. Generally, silicon oxide has a dielectric constant of 4.0.

In one embodiment, the dielectric material 16 has a thickness from 50 nm to 1000 nm. In other embodiments, the dielectric material 16 can have a thickness that is greater than or less than the thickness range mentioned above. The dielectric material 16 can be formed utilizing a deposition process such as, for example, chemical vapor deposition (CVD), plasma enhanced chemical vapor deposition (PECVD), evaporation, chemical solution deposition and spin-on coating.

After providing the dielectric material 16, a plurality of openings can be formed into the dielectric material 16. The plurality of openings may include a via opening, a line opening, a combined via and line opening, or any combination thereof. A via opening can be distinguished from a line opening in that the via opening has a narrower width than the line opening. In the particular embodiment illustrated in the drawings, a plurality of combined via and line openings are formed. In accordance with the present disclosure, the plurality of openings that are formed into the dielectric material 16 are regularly spaced. By "regularly spaced" it is meant that the distance between a center point of one opening to a center point of a nearest neighboring opening is uniform and has a same value. In the embodiment illustrated in FIG. 1, the regularly spaced openings that are formed have lithographically defined dimensions. By "lithographically defined dimensions" it is meant that the dimension of each opening is equal or larger than the current state of the art in lithographic patterning, and that these patterns are created by optical projection of a mask pattern, or direct-written by an electron beam or other focused form of radiation, from a predefined graphically-designed pattern dataset. At present, the typically minimum lithographic features in the state of the art manufacturing for the semiconductor industry are approximately 50 nm, or greater. Also, and since the regularly spaced openings are formed by lithography in this embodiment of the present disclosure, the spacing between each opening, is also equal or greater than approximately 50 nm.

The plurality of openings can formed by lithography and etching. When combined via and line openings are formed, a second iteration of lithography and etching can be used to form the same. The lithographic step may include forming a photoresist (organic, inorganic or hybrid) atop the dielectric material 16. The photoresist can be formed utilizing a deposition process such as, for example, CVD, PECVD and spin-on coating. Following formation of the photoresist, the photoresist can be exposed to a desired pattern of radiation. Next, the exposed photoresist can be developed utilizing a conventional resist development process. After the development step, an etching step can be performed to transfer the pattern from the patterned photoresist into the dielectric material 16. In one embodiment, a hard mask material such as, for example, titanium nitride and/or silicon nitride or silicon oxide, can be formed atop the dielectric material 16 prior to forming the photoresist. In such an embodiment, the pattern may be first transferred into the hard mask material and then into the dielectric material 16. In such an embodiment, the patterned photoresist is typically, but not necessarily always, removed from the surface of the structure after transferring the pattern into the hard mask material utilizing a resist stripping process such as, for example, ashing. The etching step used in forming the plurality of openings may include a dry etching process (including, for example, reactive ion etching, ion beam etching, plasma etching or laser ablation), a wet chemical etching process or any combination thereof. In one embodiment, reactive ion etching is used to form the plurality of openings.

Next, a diffusion barrier material (not shown) and a first conductive material are formed within each of the plurality of openings. The diffusion barrier (not shown) lines the wall portions within each opening and is thus positioned between the first dielectric material and the first conductive material. As such, the diffusion barrier can also be referred to as a diffusion barrier liner. The first conductive material that is formed into each opening of the plurality of openings formed in the dielectric material 16 provides the regularly spaced array of conductors 18. In this embodiment of the present disclosure, each conductor of the regularly spaced array of conductors 18 in the first level 12 has a dimension that is equal or greater than 50 nm and the spacing between neighboring conductors within the regularly spaced array is equal or greater than 50 nm.

The diffusion barrier liner can include any material that can serve as a barrier to prevent conductive material ions from diffusing into the dielectric material 16. Examples of materials that can be used as the diffusion barrier liner include, for example, Ta, TaN, Ti, TiN, Ru, RuN, RuTa, RuTaN, IrTa, IrTaN, W, WN or a multilayered stack thereof. In one embodiment, the diffusion barrier liner has a thickness from 2 nm to 50 nm. In another embodiment, the diffusion barrier liner has a thickness from 7 nm to 20 nm. The diffusion barrier liner can be formed by a deposition process including, for example, CVD, PECVD, physical vapor deposition (PVD), sputtering and plating.

The first conductive material, which serves as the conductive material of each regularly spaced array of conductors 18 in the first level 12, includes for example, a conductive metal, an alloy comprising at least two conductive metals, a conductive metal oxide, a conductive metal nitride, a conductive metal silicide or any combination thereof. In one embodiment, the first conductive material can comprise Al, Ti, TiN, Ta, TaN, W, WN, MoN, Pt, Pd, Os, Ru, $IrO_2$, $ReO_2$, $ReO_3$, or Cu. Mixtures or alloys of these conductive materials can also be employed in the present disclosure. The first conductive material can be formed by a deposition process including, for example, CVD, PECVD, PVD, sputtering, plating, chemical solution deposition and electroless plating.

After deposition of each of the diffusion barrier liner and the first conductive material, any excess diffusion barrier material and first conductive material that is located outside of each of the plurality of openings can be removed by a planarization process. In one embodiment, the planarization process includes chemical mechanical polishing (CMP). In another embodiment, the planarization process includes grinding. In a further embodiment, the planarization process includes a combination of CMP and grinding. In some embodiments and when a hard mask material is employed, the planarization process also removes remaining portions of the hard mask material that are located outside each of the plurality of opening and on the upper surface of dielectric material 16.

Figure 2:
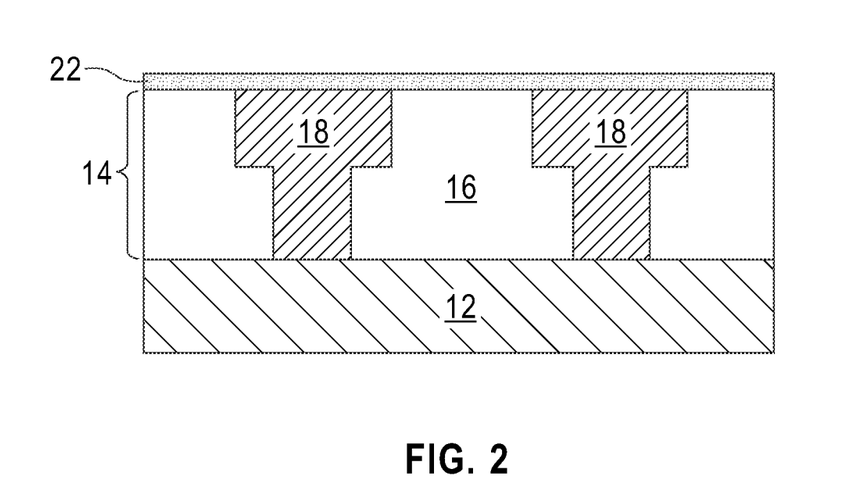
FIG. 2 is a pictorial representation (through a cross sectional view) of the structure of FIG. 1 after forming a dielectric cap atop the first level.

In some embodiments, and as illustrated in FIG. 2, a dielectric cap 22 can be formed atop the first level 12. The dielectric cap 22 that can be employed in some embodiments of the present disclosure includes any suitable dielectric capping material with diffusion barrier properties including, for example, SiC, SiCNH, $Si_3N_4$, $SiON_x$, a carbon doped oxide, a nitrogen and hydrogen doped silicon carbide SiC(N,H) or multilayers thereof. The dielectric cap 22 can be formed by a deposition process such as, for example, chemical vapor deposition, plasma enhanced chemical vapor deposition, chemical solution deposition, evaporation, and atomic layer deposition. The thickness of the dielectric cap 22 may vary depending on the technique used to form the same as well as the material make-up of the layer. Typically, the dielectric cap 22 has a thickness from 15 nm to 100 nm.

Figure 3:
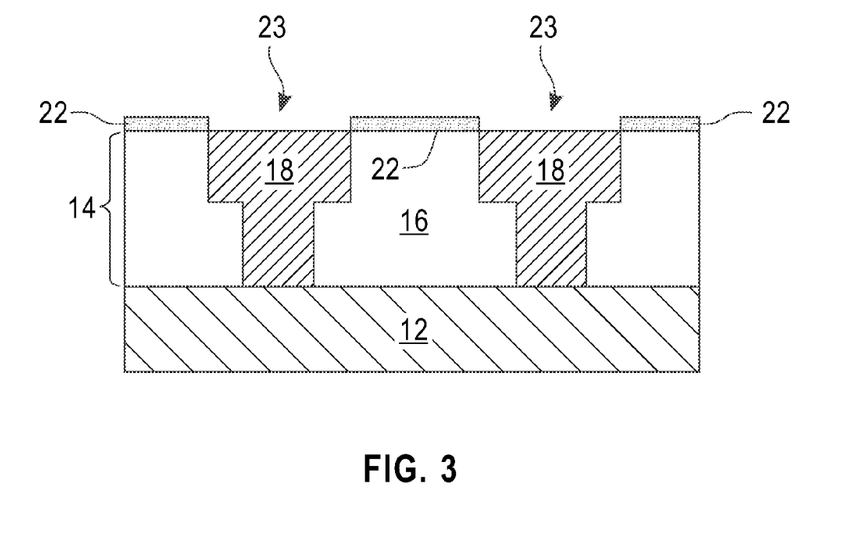
FIG. 3 is a pictorial representation (through a cross sectional view) of the structure of FIG. 2 after forming openings within the dielectric cap that expose each conductor of said regularly spaced array of conductors.

Referring now to FIG. 3, there is illustrated the structure of FIG. 2 after forming openings 23 within the dielectric cap 22. The openings 23 expose an upper surface of each regularly spaced array of conductors 18 located in the first level 12. The openings 23 that are formed into the dielectric cap 22 can be formed by lithography and etching as was described above in forming the plurality of openings within the dielectric material 16.

Figure 4:
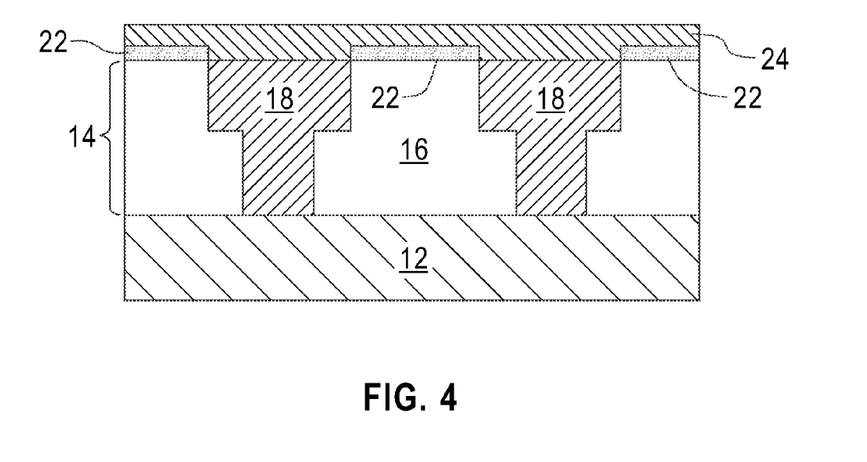
FIG. 4 is a pictorial representation (through a cross sectional view) of the structure of FIG. 3 after forming a blanket layer of a second conductive material atop the dielectric cap and within the openings formed into the dielectric cap.

Referring now to FIG. 4, there is illustrated the structure of FIG. 3 after forming a blanket layer of a second conductive material 24 atop the dielectric cap 22 and within each opening 23. The blanket layer of second conductive material 24 may comprise one of the conductive materials mentioned above for the first conductive material, which was employed as the conductive material of each regularly spaced array of conductors 18. In one embodiment, the second conductive material 24 may comprise a same conductive material as that of the first conductive material. In another embodiment, the second conductive material 24 may comprise a different conductive material than the first conductive material. The blanket layer of second conductive material 24 can be formed by a deposition process including, for example, CVD, PECVD, PVD, sputtering, plating, chemical solution deposition and electroless plating.

The thickness of the blanket layer of second conductive material 24 that is formed at this point of the present disclosure may vary depending on the type of conductive material employed as the second conductive material 24 as well as the technique that was employed in forming the blanket layer of second conductive material 24. In one embodiment, the blanket layer of second conductive material 24 has a thickness from 2 nm to 500 nm. In another embodiment, the blanket layer of second conductive material 24 has a thickness about 5 nm. Other thicknesses that are above or below the aforementioned thickness ranges can also be employed in the present disclosure, but the range from 2 nm to 500 nm is typical. In a preferred embodiment, for example, each layer is 5 nm thick.

In one embodiment, the blanket layer of second conductive material 24 is comprised of a conductive material that looses electrical continuity in response to an electrical signal. That is, the blanket layer of conductive material may comprise a conductive material that changes resistance in response to an applied current. When such a conductive material is employed as the blanket layer of second conductive material 24, the resultant conductor features that are formed therefrom can be used to provide a tampered resistance electronic structure in which a subsequently applied current pulse can be used to disrupt the electric continuity of the subsequently formed circuit.

In one embodiment, the conductive material that changes resistance in response to an applied current includes a layered structure comprising at least a bottom layer of a first metal and a top layer of a second metal or metal oxide. Typically, but not necessarily always, the layered structure includes a bilayered structure. In another embodiment, the layered structure can be repeated N times providing a multilayered structure including N repeating layered structures. In this embodiment, N is an integer of greater than 2. Typically, N is from 2 to 500, with 10 to 100 being a preferred number of repeats. Examples of first metals that can be employed in this embodiment of the present disclosure include, but are not limited to, Al, Ni, Co, Fe, Zr, Y, Nd, Li, Hf, La, Ti, TiN, Ta, TaN, W, WN, MoN, Pt, Pd, Os, Ru, and mixtures or alloys of these metals and nitrides. Examples of second metals that can be used include, but are not limited to, nickel, cobalt, iron, and titanium. Examples of metal oxides that can be employed in the present disclosure include, but are not limited to $IrO_2$, $ReO_2$, $ReO_3$, Cu, and oxides of Re, Ir, Cu, Fe, Ag, Co, Mn, Ni, Si, Sn, Ta, Ti, V, W, Cr, Pb, and oxide mixture or oxide alloys thereof.

In one embodiment of the present disclosure, the blanket layer of second conductive material 24 includes at least one layered structure comprised of at least, from bottom to top, a bottom layer of aluminum, and a top layer comprising one of nickel, cobalt, copper oxide or iron oxide. In another embodiment, the blanket layer of conductive material 24 includes at least one layered structure comprised of at least, from bottom to top, a bottom layer of aluminum, and a top layer of copper oxide. In a preferred embodiment, for example, each layer is 5 nm thick, and the layers are aluminum (5 nm) and a layer comprising one of nickel, cobalt, copper oxide or iron oxide (5 nm). An example structure that can be employed in the present disclosure comprises 5 nm of aluminum and 5 nm of copper oxide in alternating layers.

As stated above, conductive materials that change resistance in response to an applied current include Al/CuO multilayers where initially small currents can be conducted through the continuous Al layers but when excessively heated from a larger electrical current, the Al and CuO layers undergo a chemical reaction resulting in Cu and $Al_2O_3$. The resulting Cu is discontinuous for initially small bilayer thicknesses (e.g., less than 10 nm) in which case the resistance is very high. If so desired, the resistance change can be less severe if the multilayer stoichiometry is changed, or if the reaction is incomplete due to heat losses away from the multilayer, if the layered structure thickness is large (e.g., greater than 100 nm), or if both the first and second metals are metallic. Other materials as listed above may also be used.

The above layered structure and the multilayered structure including N repeating layered structures react and release heat (via an exothermic reaction) when a current pulse is applied to the structure. Any current pulse that causes an exothermic reaction within the layered structure can be employed in the present disclosure. In one typical embodiment of the present disclosure, and for a bilayered structure of Al as the bottom layer of copper oxide as the top layer, the current pulse that can used to initiate the exothermic reaction is from 1 $kA/cm^2$ to 10 $MA/cm^2$. In another typical embodiment of the present disclosure, and for a bilayered structure of Al as the bottom layer and Ni as the top layer, the current pulse that can used to initiate the exothermic reaction is from 1 $kA/cm^2$ to 10 $MA/cm^2$.

When a layered structure is employed as the blanket layer of second conductive material 24, the layered structure can be formed utilizing one of the above mentioned deposition processes. In one embodiment, the layered structure is formed by sputtering the bottom layer and sputtering the top layer. The thickness of each layer of the layered structure can vary depending on the type of material used in each layer as well as the techniques that was used in forming each layer. In one embodiment, the bottom layer of the layered structure has a thickness from 2 nm to 500 nm, while the top layer of the layered structure has a thickness from 2 nm to 500 nm. In a preferred embodiment, for example, each layer is 5 nm thick, and the layers are aluminum (5 nm) and a layer comprising one of nickel, cobalt, copper oxide or iron oxide (5 nm). An example structure that can be employed is comprised of 5 nm aluminum and 5 nm of copper oxide in alternating layers.

Figure 5:
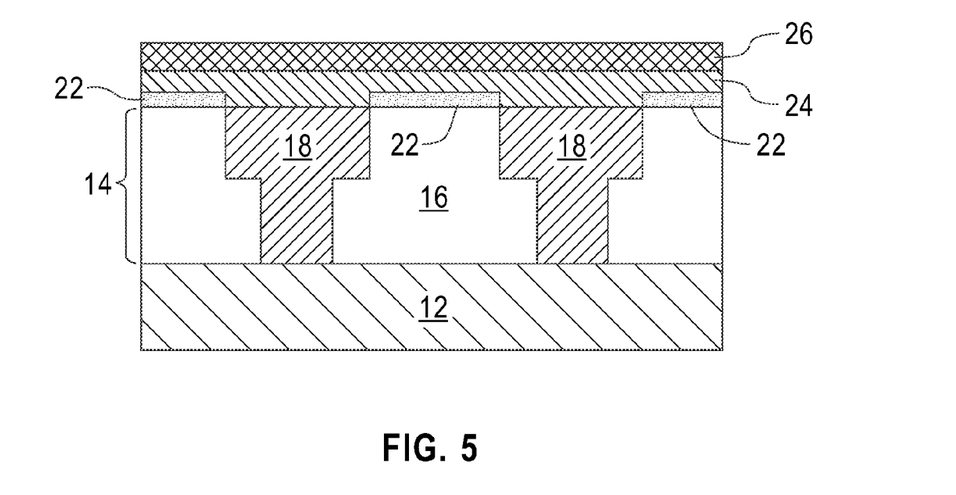
FIG. 5 is a pictorial representation (through a cross sectional view) of the structure of FIG. 4 after forming an optional etch mask on an exposed surface of the blanket layer of the second conductive material.

Referring now to FIG. 5, there is illustrated the structure of FIG. 4 after forming an etch mask 26 on an exposed surface of the blanket layer of second conductive material 24. In some embodiments, the formation of an etch mask 26 on the exposed surface of the blanket layer of second conductive material 24 can be omitted and as such, the etch mask 26 represents an optional element of the present disclosure. When present, the etch mask 26 includes any dielectric material having an etch selectivity that differs from the blanket layer of second conductive material 24. Examples of suitable dielectric materials that can be used as etch mask 26 include silicon oxide, silicon nitride, silicon oxynitride, or any multilayered combination thereof. The etch mask 26 can be formed by a deposition process such as, for example, chemical vapor deposition, plasma enhanced chemical vapor deposition, and chemical solution deposition. The thickness of the etch mask 26 can vary depending on the materials of the etch mask 26 itself and the technique used to form the same. Typically, the etch mask 26 has a thickness from 10 nm to 500 nm.

Figure 6:
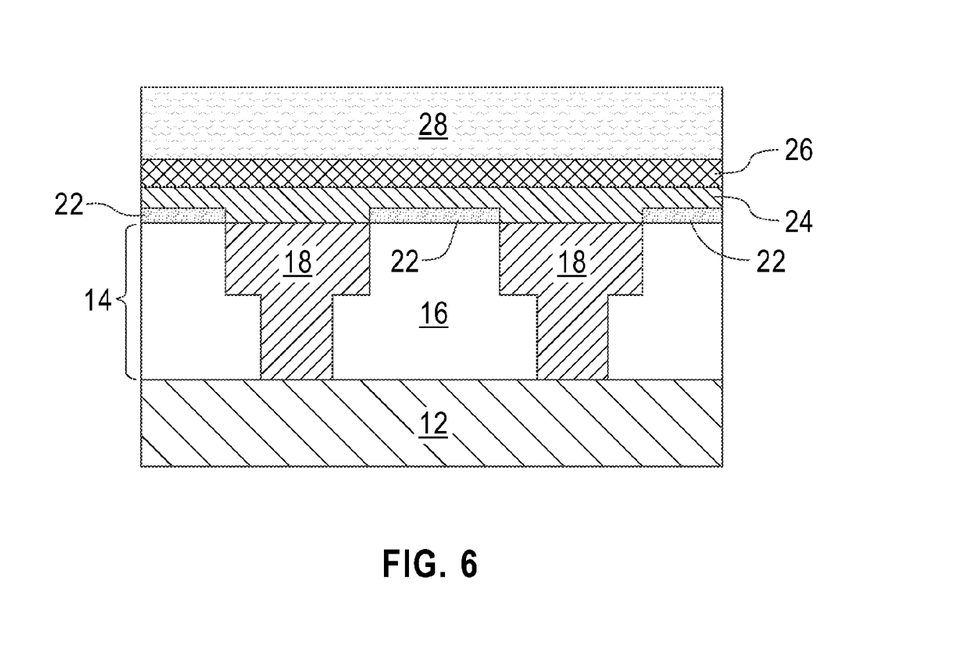
FIG. 6 is a pictorial representation (through a cross sectional view) of the structure of FIG. 5 after forming a random block copolymer layer on an exposed surface of the optional etch mask.

Referring now to FIG. 6, there is illustrated the structure of FIG. 5 after forming a random block copolymer layer 28 on an exposed surface of the etch mask 26. By "random block copolymer" it is meant a polymer that includes two or more polymer units, i.e., blocks, that can be present in the polymeric composition in any non-repeating order. That is, the blocks within the copolymer composition do not have any repeating pattern, but instead the blocks are present in random order. In some embodiments and when the etch mask 26 is not employed (not shown), the random block copolymer layer 28 can be formed on an exposed surface of the blanket layer of second conductive material 24.

The random block copolymer layer 28 employed in the present disclosure includes a self-assembling random block copolymer that is capable of self-organizing into nanometer-scale patterns which are randomly ordered. Under suitable conditions, two or more immiscible polymeric block components separate into two or more different phases on a nanometer scale and thereby form randomly ordered patterns of isolated nano-sized structural units. Such randomly ordered patterns of isolated nano-sized structural units formed by the self-assembling random block copolymers can be used for fabricating nano-scale structural units in semiconductor, optical, and magnetic devices. Specifically, dimensions of the structural units so formed are typically in the range of 10 nm to 40 nm, which are sub-lithographic (i.e., below the resolutions of the lithographic tools which as of the filing date of this application is below 50 nm).

Exemplary materials for the random block copolymer layer 28 are described in commonly-assigned, U.S. Pat. No. 7,605,081 issued Oct. 20, 2009 and U.S. Pat. No. 7,741,721, issued Jun. 22, 2010, the contents of which are incorporated herein by reference. Specific examples of self-assembling random block copolymers that can be used in the present disclosure include, but are not limited to, polystyrene-random-polymethylmethacrylate (PS-r-PMMA), polystyrene-random-polyisoprene (PS-r-PI), polystyrene-random-polybutadiene (PS-r-PBD), polystyrene-random-polyvinylpyridine (PS-r-PVP), polystyrene-random-polyethyleneoxide (PS-r-PEO), polystyrene-random-polyethylene (PS-r-PE), polystyrene-random-polyorganosilicate (PS-r-POS), polystyrene-random-polyferrocenyldimethylsilane (PS-r-PFS), polyethyleneoxide-radom-polyisoprene (PEO-r-PI), polyethyleneoxide-random-polybutadiene (PEO-r-PBD), polyethyleneoxide-random-polymethylmethacrylate (PEO-r-PMMA), polyethyleneoxide-random-polyethylethylene (PEO-r-PEE), polybutadiene-random-polyvinylpyridine (PBD-r-PVP), and polyisoprene-random-polymethylmethacrylate (PI-r-PMMA).

The self-assembling random block copolymers are first dissolved in a suitable solvent system to form a random block copolymer solution, which is then applied onto the surface of the structure shown in FIG. 5 (or optional onto the surface of the structure shown in FIG. 4) and then annealed to form the random block copolymer layer 28. The solvent system used for dissolving the random block copolymer and forming the random block copolymer solution may comprise any suitable solvent, including, but not limited to, toluene, propylene glycol monomethyl ether acetate (PGMEA), propylene glycol monomethyl ether (PGME), and acetone. The random block copolymer layer 28 can be formed by a deposition process such as, for example, chemical solution deposition or spin-coating.

After application and annealing, the self-assembling random block copolymer can be converted into random block copolymer layer 28 that includes a first polymeric block copolymer component (not shown) and a second block copolymer component (not shown), which blocks are randomly oriented within the random block copolymer layer 28. The anneal mentioned above may be performed, for example, at a temperature from 200° C. to 300° C. for a duration from less than 1 hour to 100 hours.

Next, one of the polymeric block components of the random block copolymer layer 28 is removed selective to the other polymeric block component. In one embodiment of the present disclosure, each of the first polymeric block components is removed from the random block copolymer layer 28. In another embodiment, each of the second polymeric block components can be removed from the random block copolymer layer 28. Notwithstanding which polymeric block component is removed, an etching process that selectively removes one of the polymeric block components relative to the other polymeric block component can be used. In one embodiment, etching in oxygen or hydrogen can be used in removing one of the polymeric block components relative to the other polymeric block component, which is not removed in the etch.

Figure 7:
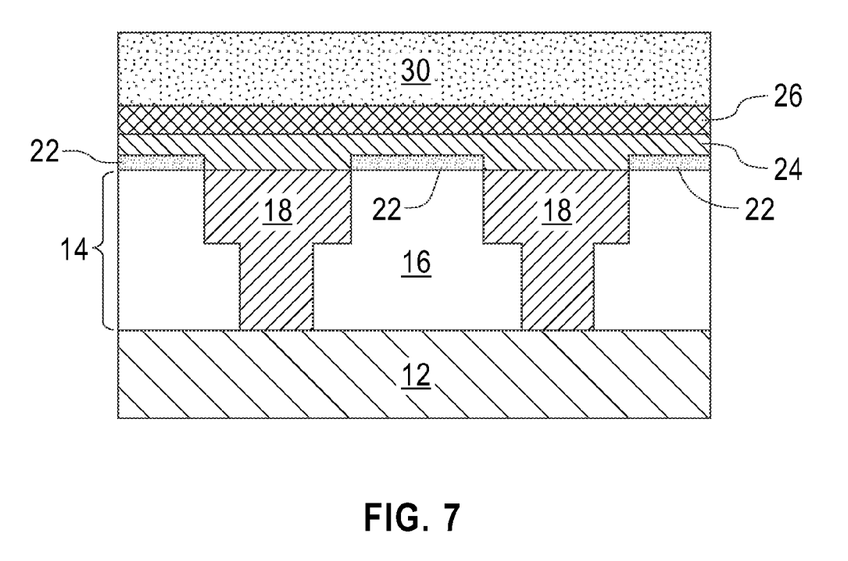
FIG. 7 is pictorial representation (through cross sectional view) of the structure of FIG. 6 after forming a polymeric etch mask having a non-repeating random pattern atop the blanket layer of the second conductive material.

Upon removal of one of the polymeric block components from the random block copolymer layer 28, a polymeric etch mask 30 as shown in FIG. 7 and comprising one of the polymeric block components having a randomly oriented, i.e., non-repeating, pattern is provided. The randomly oriented pattern has dimensions that are sub-lithographic, i.e., 50 nm or less, typically, from 1 nm to 40 nm.

Next, the non-repeating random pattern within polymeric etch mask 30 is transferred into the optional etch mask 26 and the blanket layer of second conductive material 24 utilizing one or more etching steps. For example, a first etch such as, for example, a fluorine containing reactive ion etch (RIE) can be used to transfer the non-repeating random pattern of polymeric etch mask 30 into the optional etch mask 26, and then a second etch, such as, for example, a metal etch comprising chlorine can be used to complete the transfer of the non-repeating random pattern into the blanket layer of second conductive material 24. In some embodiments, polymeric etch mask 30 can be removed after the non-repeating random pattern is transferred only into optional etch mask 26. In other embodiments, the polymeric etch mask 30 can remain on the structure and is removed after the non-repeating random pattern has been transferred to the blanket layer of second conductive material 24.

In one embodiment, polymeric etch mask 30 can be removed from the structure after at least transferring the non-repeating random pattern into etch mask 26 utilizing an RIE designed to etch the polymer, or a wet clean solution designed to etch the polymer. Etch mask 26 can be removed from the structure after transferring the non-repeating random pattern into the blanket layer of second conductive material utilizing an RIE dry etch based on fluorine.

Figure 8:
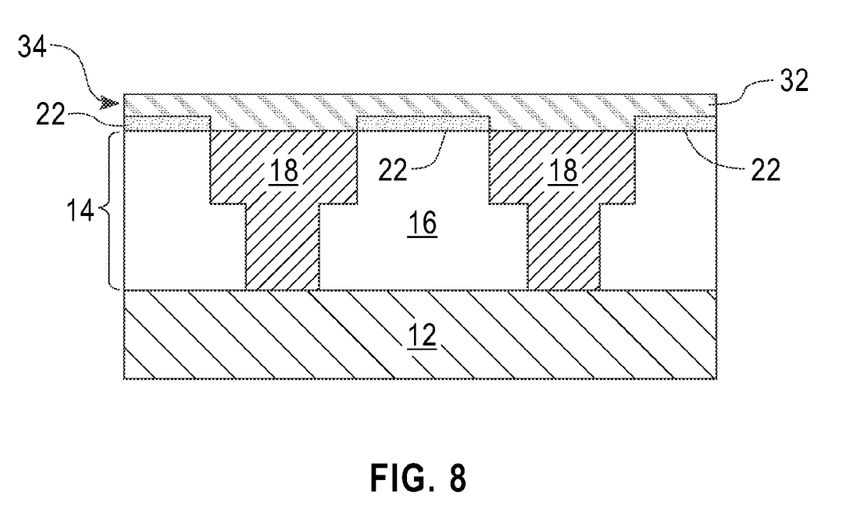
FIG. 8 is a pictorial representation (through a cross sectional view) of the structure of FIG. 7 after the non-repeating random pattern of the polymeric etch mask has been transferred into the blanket layer of second conductive material and removal of the polymeric etch mask and the optional etch mask from the structure.

Referring now to FIG. 8, there is illustrated the structure of FIG. 7 after the non-repeating random pattern has been transferred into the blanket layer of second conductive material 24 and removal of polymeric etch mask 30 and optional etch mask 26. In the drawing, a plurality of conductor features 32 is formed atop the first level 12 and represent a second level 34 of the structure of the present disclosure. Each conductor feature of the plurality of conductor features 32 comprises the second conductive material and has a non-repeating random shape, which mimics the non-repeating random pattern within polymeric etch mask 30. The non-repeating random shapes have sub-lithographic dimensions, i.e., dimensions of 50 nm or less. Examples of non-repeating random shapes include, but are not limited to, curved lines, whorls, spirals, coils, and distorted versions of these.

In accordance with the present disclosure, a fraction of some of the conductor features of plurality of conductor features in the second level provides electrical continuity between pairs of the regularly spaced array of conductors located in the first level, and another fraction, of other of the conductor features of the plurality of conductor features in the second level does not provide electrical continuity between any pair of the regularly spaced array of conductors located in the first level. This is illustrated clearly in FIGS. 9D and 9E to follow.

In some embodiments of the present disclosure, an energy source (not shown) can be connected to the regularly spaced array of conductors 18 in the first level 12, wherein upon detection of a tamper event a current is provided by the energy source that flows from the regularly spaced array of conductors 18 in the first level 12 through the plurality of conductor features 32 in the second level 24 and removes the electrical continuity. Generally, the current or energy source is an off-chip battery, and optionally said battery may be inside a tamper proof package in close contact to the secure IC. Other energy storage devices or a power supply may be used off-chip to provide current to the conductors. In other embodiments, a miniature battery, capacitor, radioactive radiation cell, or another energy storage device is integrated on the secure IC, to provide an on-chip current source.

In another embodiments, an energy source (not shown) can connected to the regularly spaced array of conductors 18 in the first level 12, wherein upon detection of a tamper event a current is provided by the energy source that flows from the regularly spaced array of conductors 18 in the first level 12 to the plurality of conductor features in the second level 34 and changes resistance of each of the conductor features of said plurality of conductor features 32 in the second level 34. In different embodiments, the energy storage devices described above may be used.

In such an embodiment, the change in resistance can be measured using a circuit that is capable of measure resistance in such arrays. In one embodiment, a demultiplexer such as disclosed, for example, in U.S. Pat. No. 6,256,767, and the publication entitled "Nanoelectronics from the bottom up" Nature Materials, vol. 6, November 200, can be used to read the electronic structure of the present disclosure. A demultiplixer also represents one type of circuit that can be used to address the regularly spaced array of conductors 18 of the first level 12 and to read locations in which electrical continuity is provided within the electronic structure and locations in which non-electrical continuity is provided in the electronic structure. Non-electrical continuity is defined in the present disclosure by a wide range of resistance values all measurably larger than the initial, as fabricated, resistance. In one example, the resistance is 10-100 times the initial resistance. In the other example, the resistance is so large that it is not measurable. In one embodiment, non-electrical continuity means the resistance is at least 10-100 times the initial, as fabricated, resistance. In other embodiments, non-electrical continuity means the resistance is much greater including 1000 to a million times the initial resistance, or greater by more than this.

Figure 9A:
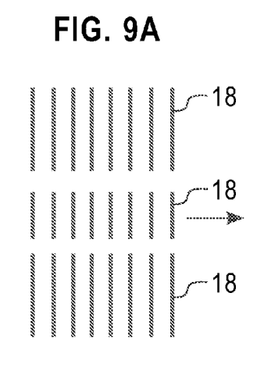
FIGS. 9A-9E show down-top views of some of the processing steps shown in FIGS. 1-8.
Figure 9B:
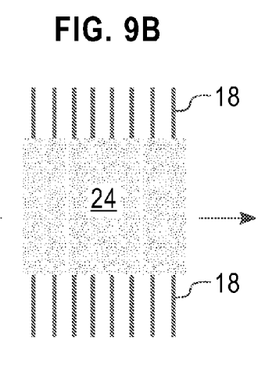
Figure 9C:
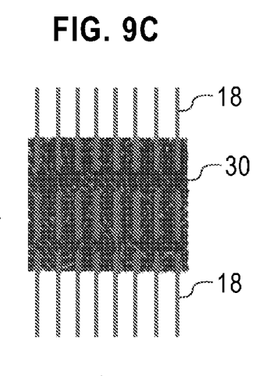
Figure 9D:
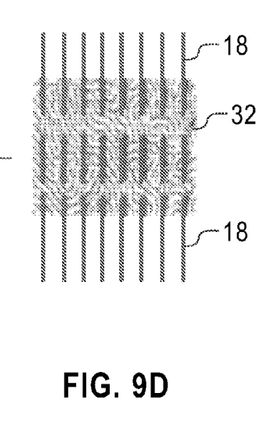
Figure 9E:
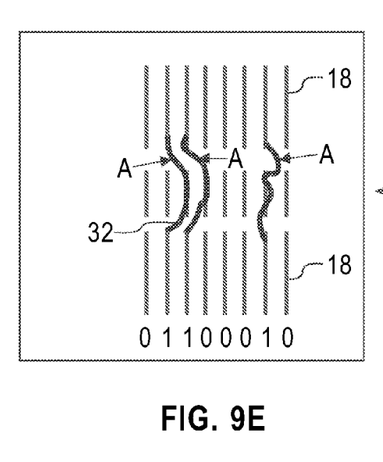

Some of the above processing steps illustrated in FIGS. 1-8 are now highlighted in FIGS. 9A-9E which provide top-down views of the electronic structure of the present disclosure after different stages of fabrication. In these top-down views only certain elements are shown to highlight those elements. Specifically, FIG. 9A shows the structure after forming the regular spaced array of conductors 18, FIG. 9B shows the structure after forming the blanket layer of second conductive material 24, FIG. 9C shows the structure after forming the polymeric etch mask 30, FIG. 9D shows the structure after transferring the pattern from the polymeric etch mask 30 into the blanket layer of second conductive material 24 forming the plurality of conductor features 32 having non-repeating random pattern shapes, and FIG. 9E highlights a fraction A of some of the conductor features of plurality of conductor 32 features in the second level provides electrical continuity between pairs of the regularly spaced array of conductors located in the first level. The another fraction of the conductor features of the plurality of conductor features which does not provide electrical continuity between any pair of the regularly spaced array of conductors located in the first level is not shown in FIG. 9E, but can been seen in FIG. 9D.

Figure 10A:
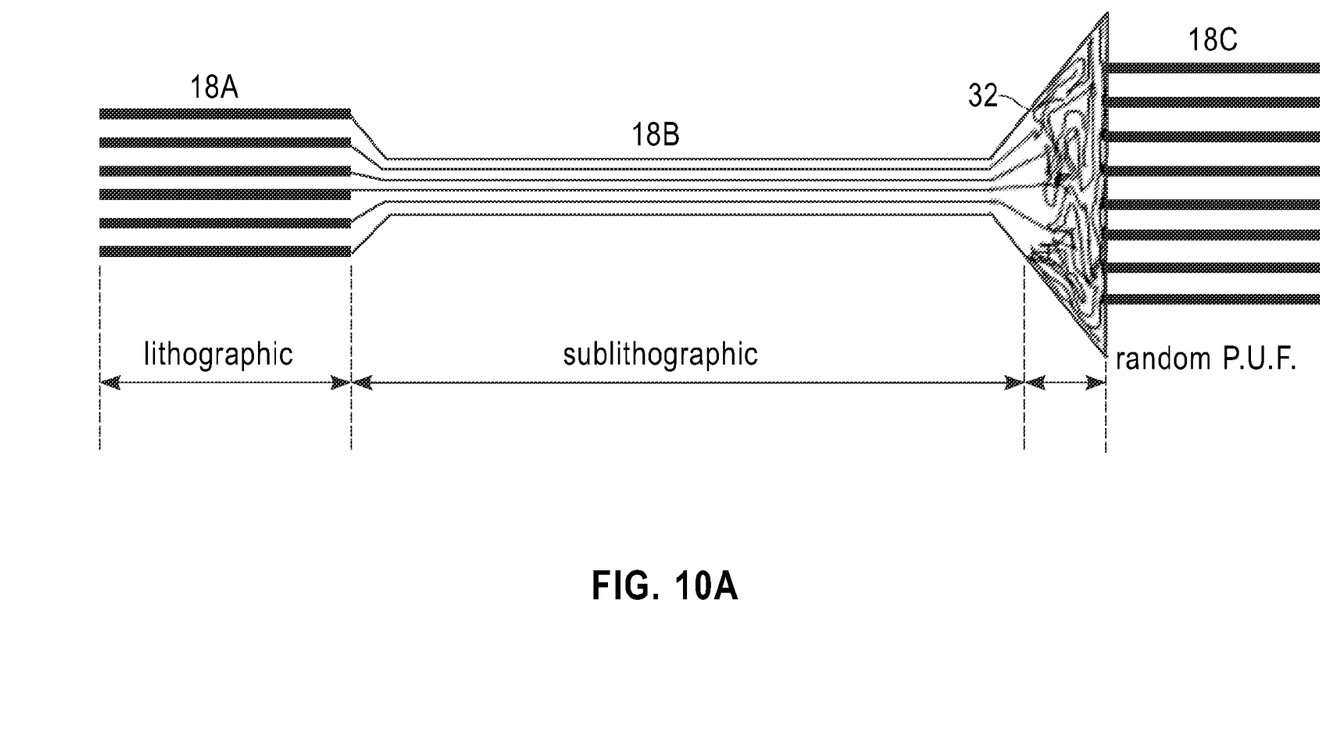
FIGS. 10A-10B illustrate in top-down views another exemplary electronic structure of the present application including at least a first array of regular spaced apart conductors having lithographic dimensions and a second array of regular spaced apart conductors having sub-lithographic dimensions in a first level of the structure, wherein each conductor within the first array is spaced apart by a distance of greater than 50 nm and wherein each conductor within the second array is spaced apart by a distance of 50 nm or less, and wherein each conductor of the second array is connected to a conductor of the first array, and the fraction of conductor features having non-repeating random shapes within a second level provides electrical continuity between a pair of conductors of the second array.
Figure 10B:
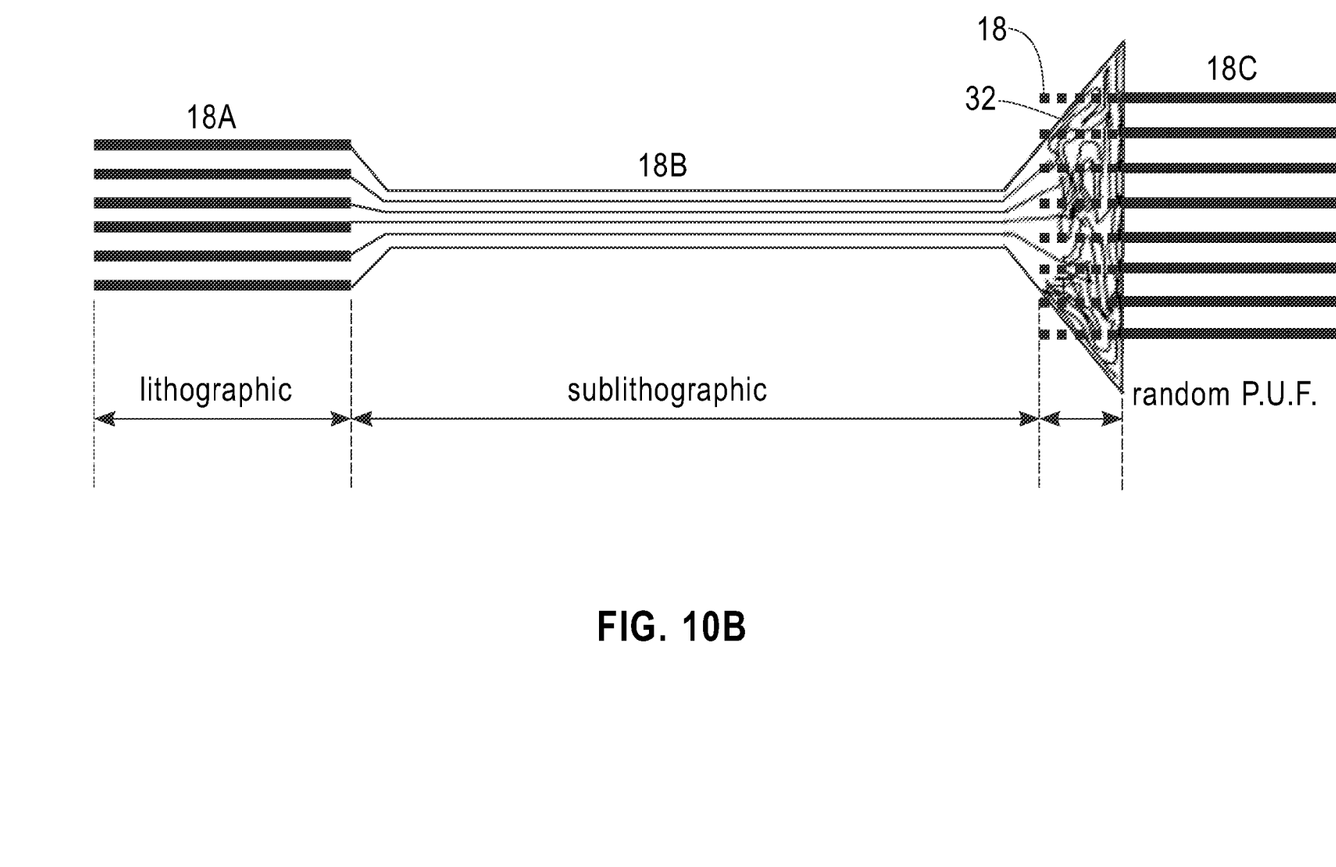

Reference is now made to FIGS. 10A-10B which are top-down views of another exemplary electronic structure of the present disclosure. The exemplary structure of this embodiment is similar to the electronic structure described above and illustrated in FIG. 8 except that the first level 12 includes a regularly spaced first array of conductors 18A having lithographic dimensions in which the pitch, i.e., spacing between each conductor 18A is lithographically defined (i.e., pitch greater than 50 nm) and a regularly spaced second array of conductors 18B having sub-lithographic dimensions in which the pitch, i.e., spacing between each conductor 18B is sub-lithographically defined (i.e., pitch of 50 nm or less, for example 40 nm, or <40 nm).

Directed self-assembly of lamellar-phase diblock copolymers with a mixture of homopolymer is used for this pattern, which includes a directed non-random sublithographic pitch region, a flaring of the pitch which is truncated to meet a lithographic pitch patterned section, and a second flared-pitch section which goes beyond the stable region to disassociate into radom pitch patterns to form the PUF section. These three regions are defined by a pre-patterned trench in the dielectric to direct the self assembly ("grapho-epitaxy"), or a pre-exposed region of a photoactive material to direct the self-assembly ("chemo-epitaxy"). Since all three regions consist of continuous line patterns that can be used to form metal interconnects, this scheme forms the electrically continuous interconnects of the PUF which are contacted lithographically on one end, and contacted through the regular array of contacts below or above at the other end. Thus, electrically continuous and addressable leads to electrically-addressable PUF channels for each separate interconnect, which is randomly connected to the array channels. As shown, each conductor 18B is connected to one of conductors 18A at location $l_1$.

As also shown, a regularly spaced third array of conductors 18C having lithographic dimensions in which the pitch, i.e., spacing between each conductor 18C is lithographically defined (i.e., pitch greater than 50 nm) can also be optionally present. When present each conductors 18C is connected to a conductor 18B at location $l_2$ and an electrical path is provided between the regularly spaced first and third arrays of 18A, 18C by the regularly spaced second array of conductors 18B.

The regularly spaced first array of conductors 18A and, if present, the regularly spaced third array of conductors 18C can be formed by lithography and etching as defined above for forming conductors 18.

The regularly spaced second array of conductors 18B can be formed, either before or after the regularly spaced first and second arrays of conductors 18A, 18C are formed, utilizing a diblock copolymer as a self-assembling block copolymer that is capable of self-organizing into nanometer-scale patterns. Under suitable conditions, two or more immiscible polymeric block components separate into two or more different phases on a nanometer scale and thereby form ordered patterns of isolated nano-sized structural units. Such ordered patterns of isolated nano-sized structural units formed by the self-assembling block copolymers can be used for fabricating nano-scale structural units in semiconductor, optical, and magnetic devices. Specifically, dimensions of the structural units so formed are typically in the range of 10 nm to 50 nm, with 40 nm being a example dimension, which are sub-lithographic (i.e., below the resolutions of the lithographic tools).

Exemplary materials for the diblock copolymer layer are described in commonly-assigned, U.S. Pat. No. 7,605,081 issued Oct. 20, 2009, the contents of which are incorporated herein by reference. Specific examples of self-assembling block copolymers that can be used for forming the structural units of the present disclosure may include, but are not limited to, polystyrene-block-polymethylmethacrylate (PS-b-PMMA), polystyrene-block-polyisoprene (PS-b-PI), polystyrene-block-polybutadiene (PS-b-PBD), polystyrene-block-polyvinylpyridine (PS-b-PVP), polystyrene-block-polyethyleneoxide (PS-b-PEO), polystyrene-block-polyethylene (PS-b-PE), polystyrene-b-polyorganosilicate (PS-b-POS), polystyrene-block-polyferrocenyldimethylsilane (PS-b-PFS), polyethyleneoxide-block-polyisoprene (PEO-b-PI), polyethyleneoxide-block-polybutadiene (PEO-b-PBD), polyethyleneoxide-block-polymethylmethacrylate (PEO-b-PMMA), polyethyleneoxide-block-polyethylethylene (PEO-b-PEE), polybutadiene-block-polyvinylpyridine (PBD-b-PVP), and polyisoprene-block-polymethylmethacrylate (PI-b-PMMA). The self-assembling block copolymers are first dissolved in a suitable solvent system to form a block copolymer solution, which is then applied onto the surface of the structure and then annealed to form the diblock copolymer layer. The solvent system used for dissolving the block copolymer and forming the block copolymer solution may comprise any suitable solvent, including, but not limited to, toluene, propylene glycol monomethyl ether acetate (PGMEA), propylene glycol monomethyl ether (PGME), and acetone. The diblock copolymer layer can be formed by deposition process such as, for example, chemical solution deposition or spin-coating.

After application and annealing the self-assembling block copolymer can be converted into a diblock copolymer layer that includes a first polymeric block copolymer component and a second block copolymer component. Each of the first and second components forms features with a characteristic dimension that is sub-lithographic. Optionally, an anneal may be performed, for example, at a temperature from 200° C. to 300° C. for a duration from less than 1 hour to 100 hours.

After the anneal one of the polymeric block components is removed selective to the another and the remaining polymeric block component is used as an etch mask to transfer the sub-lithographic pattern into the dielectric material 16. The remaining polymeric block component is then removed and the openings (which have sub-lithographic dimensions and pitch, are then filled with a diffusion barrier liner and a conductive material as described above for forming the conductor 18.

The exemplary structure shown in FIGS. 10A-10B further includes a plurality of conductor features 32 located atop the level including the regularly spaced first, second and optionally third array of conductors 18A, 18B and 18C. The plurality of conductors 32 can formed as described above. In accordance with the present disclosure, a fraction of some of the conductor features of plurality of conductor features 32 provides electrical continuity between pairs of the regularly spaced second array of conductors 18B located in the first level, and another fraction, of other of the conductor features of the plurality of conductor features 32 does not provide electrical continuity between any pair of the regularly spaced second array of conductors 18B located in the first level. In FIG. 10A, no overlap is shown between the third array of conductors 18C and the plurality of conductor features 32. FIG. 10B shows overlap between a portion of the third array of conductors 18C (labeled as 18D in FIG. 10B) and the plurality of conductor features 32. The overlap portion 18D of the third array of conductors 18C can be located above or below the plurality of conductors 32.

In some embodiments in which only the regularly spaced first array of conductors 18A is present, electrical resistance can by measured in any pair of conductors within the array. In other embodiments, in which the regularly spaced first array of 18A and the regularly spaced third array of conductors 18C are present, the electric resistance can be measured between the conductors within both the first and third arrays 18A, 18C. In either embodiment, two levels of security can be provided. The first level of security is provided by the electric continuity provided by some of the plurality of conductors 32 that are in contact with the regularly spaced second array of conductors 18B, and the second level of security is provided by the electric resistance between any pair of conductors of the regular spaced first array of conductors 18A or between the conductors within both the regularly spaced first and third arrays of conductors 18A, 18C.

The resistance value can be measured within the first level 12 between any pair of conductors within the regularly spaced first array of conductors or between the conductors within both the regularly spaced first and third array of conductors 18A, 18C using an circuit that is capable of measure resistance in such arrays. In one embodiment, a demultiplexer such as disclosed, for example, in U.S. Pat. No. 6,256,767, and the publication entitled "Nanoelectronics from the bottom up" Nature Materials, vol. 6, November 2007, can be used to read the electronic structure of the present disclosure. In some embodiments, the demultiplexer can be wired to any of the regularly spaced first and/or third array of conductors 18A, 18C.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. An electronic structure comprising:
    a first level and a second level atop the first level, wherein one of the first level or the second level comprises a regularly spaced array of conductors, and the other of the first or second level not including the regularly spaced array of conductors comprises a plurality of conductor features, wherein each conductor feature of the plurality of conductor features is present as non-repeating random shapes, and wherein a fraction of some of the conductor features of the plurality of conductor features provides electrical contact between pairs of the regularly spaced array of conductors, and another fraction of other of said conductor features of the plurality of the conductor features does not provide electrical contact between any pair of the regularly spaced array of conductors.

2. The electronic structure of claim 1, wherein said first level includes said regularly spaced array of conductors, and said second level comprises said plurality of conductor features.

3. The electronic structure of claim 1, wherein said second level includes said regularly spaced array of conductors, and said first level comprises said plurality of conductor features.

4. The electronic structure of claim 1, further comprising at least one circuit to address the regularly spaced array of conductors and to read locations in which electrical continuity is provided within the electronic structure and locations in which non-electrical continuity is provided in the electronic structure.

5. The electronic structure of claim 1, wherein each conductor of said plurality of conductors is comprised of a conductive material that loses electrical continuity in response to an electrical signal.

6. The electronic structure of claim 5, wherein said material is selected from the group consisting of Al, Ni, Co, Fe, Zr, Y, Nd, Li, Hf, La, Ti, TiN, Ta, TaN, W, WN, MoN, Pt, Pd, Os, Ru, Cu, and oxides of Re, Ir, Cu, Fe, Ag, Co, Mn, Ni, Si, Sn, Ta, Ti, V, W, Cr, Pb and mixtures or alloys thereof.

7. The electronic structure of claim 1, further comprising an energy source connected to said regularly spaced array of conductors, wherein upon detection of a tamper event a current is provided by the energy source that flows from the regularly spaced array of conductors through the plurality of conductor features and removes said electrical continuity.

8. The electronic structure of claim 1, further comprising an energy source connected to said regularly spaced array of conductors, wherein upon detection of a tamper event a current is provided by the energy source that flows from the regularly spaced array of conductors to the plurality of conductor features and changes the resistance of at least one of said conductor features of said plurality of conductor features.

9. The electronic structure of claim 1, wherein said regularly spaced array of conductors comprises a regularly spaced first array of conductors having lithographic dimensions and a regularly spaced second array of conductors having sub-lithographic dimensions, and wherein each conductor of the second array is connected to a conductor of said first array, and said fraction of said conductor features provides electrical continuity between a pair of conductors of said second array.

10. The electronic structure of claim 9, further comprising a regularly spaced third array of conductors having lithographic dimensions in a level including said regularly spaced first array of conductors, and wherein each conductor of the second array is connected to a conductor of said third array, and said fraction of said conductor features provides electrical continuity between a pair of conductors of said second array.

11. The electronic structure of claim 1, wherein each conductor feature of the plurality of conductor features comprises a layered structure comprising at least a bottom metal layer and a top metal or metal oxide layer wherein the layered structure exhibits an exothermic reaction upon application of a current pulse.

12. An integrated circuit comprising:
at least one semiconductor device located upon a portion of a semiconductor substrate;
a first level located atop the semiconductor substrate; and
a second level located atop the first level, wherein one of the first level or second level comprises a regularly spaced array of conductors, and the other of the first level or second level not including the regularly spaced array of conductors comprises a plurality of conductor features, wherein each conductor feature of the plurality of conductor features is present as non-repeating random shapes, and wherein a fraction of some of the conductor features of the plurality of conductor features provides electrical contact between pairs of the regularly spaced array of conductors, and another fraction of other of said conductor features of the plurality of the conductor features does not provide electrical contact between any pair of the regularly spaced array of conductors.

13. The integrated circuit of claim 12, wherein said first level includes said regularly spaced array of conductors, and said second level comprises said plurality of conductor features.

14. The integrated circuit of claim 12, wherein said second level includes said regularly spaced array of conductors, and said first level comprises said plurality of conductor features.

15. The integrated circuit of claim 12, further comprising an energy source connected to said regularly spaced array of conductors, wherein upon detection of a tamper event a current is provided by the energy source that flows from the regularly spaced array of conductors through the plurality of conductor features and removes said electrical continuity.

16. The integrated circuit of claim 12, further comprising an energy source connected to said regularly spaced array of conductors, wherein upon detection of a tamper event a current is provided by the energy source that flows from the regularly spaced array of conductors to the plurality of conductor features and changes resistance of each of said conductor features of said plurality of conductor features.

17. The integrated circuit of claim 12, wherein said regularly spaced array of conductors comprises a regularly spaced first array of conductors having lithographic dimensions and a regularly spaced second array of conductors having sub-lithographic dimensions, and wherein each conductor of the second array is connected to a conductor of said first array, and said fraction of said conductor features provides electrical continuity between a pair of conductors of said second array.

18. The integrated circuit of claim 17, further comprising a regularly spaced third array of conductors having lithographic dimensions in a level including said regularly spaced first array of conductors, and wherein each conductor of the second array is connected to a conductor of said third array, and said fraction of said conductor features provides electrical continuity between a pair of conductors of said second array.

19. The integrated circuit of claim 12, wherein each conductor feature of the plurality of conductor features comprises a layered structure comprising at least a bottom metal layer and a top metal or metal oxide layer wherein the layered structure exhibits an exothermic reaction upon application of a current pulse.

\* \* \* \* \*